April 7, 1970 G. LICHTENAUER ET AL 3,504,565
SPUR GEAR SYSTEM OF CROSSED AXES AND METHOD
OF MANUFACTURING SAME
Filed June 25, 1968 2 Sheets-Sheet 1
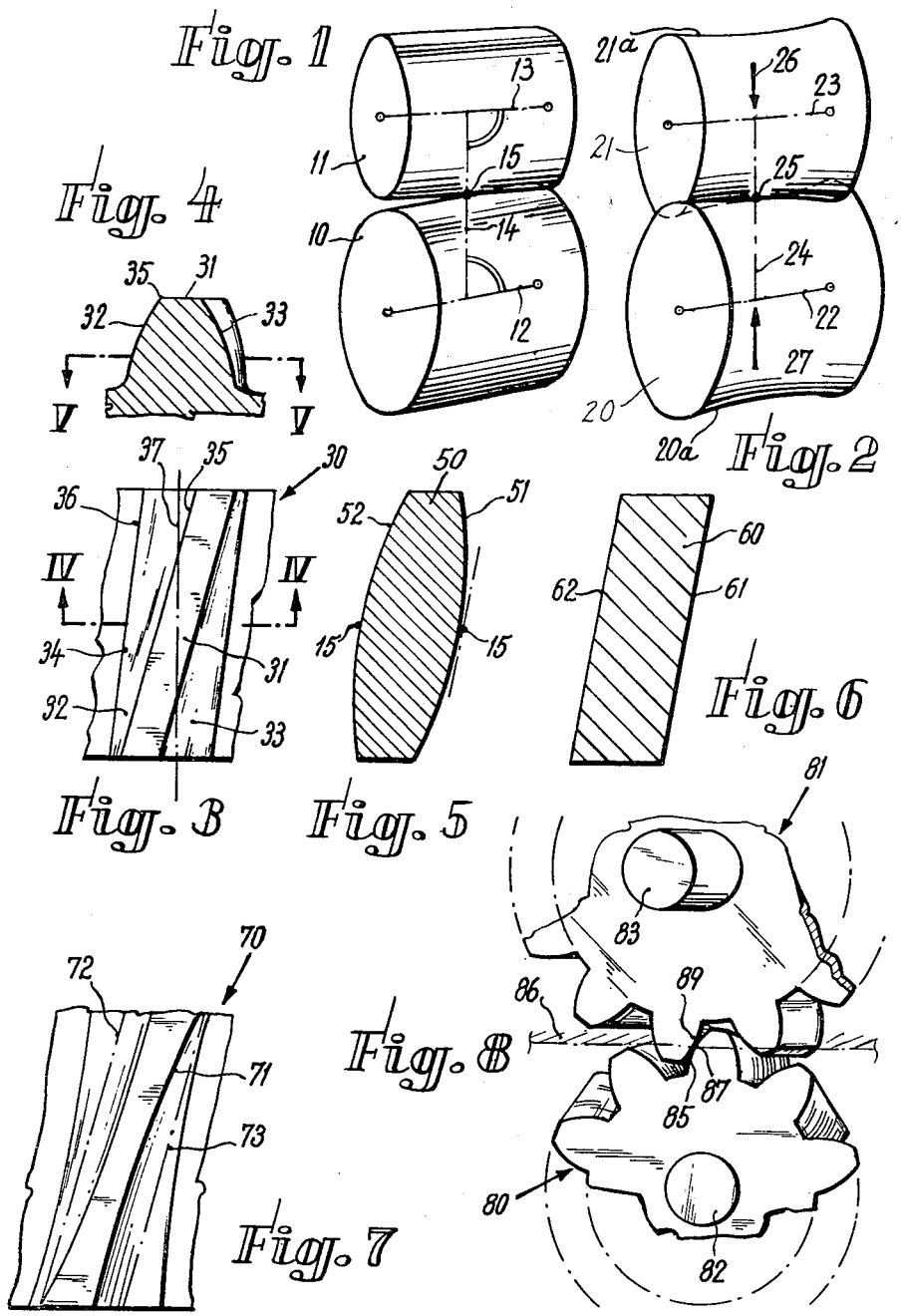
Inventors:
GERD LICHTENAUER
HERBERT LOOS
BY
Woodhams, Blanchard & Flynn
ATTORNEYS Inventors:
GERD LICHTENAUER
HERBERT LOOS
BY
Woodhams, Blanchard & Flynn
ATTORNEYS United States Patent Office 3,504,565
Patented Apr. 7, 1970

3,504,565
SPUR GEAR SYSTEM OF CROSSED AXES AND METHOD OF MANUFACTURING SAME
Gerd Lichtenauer and Herbert Loos, Munich, Germany, assignors to Carl Hurth Maschinen- und Zahnradfabrik, Munich, Germany, a corporation of Germany
Filed June 25, 1968, Ser. No. 739,829
Claims priority, application Germany, July 3, 1967, H 63,183; May 17, 1968, 1,752,391
Int. Cl. F16h 55/04; B21d 53/28; B23f 19/06
U.S. Cl. 74—458                                                    7 Claims

ABSTRACT OF THE DISCLOSURE

A gear train comprising a pair of spur gears operating with crossed axes wherein a plane lying midway between and parallel to the gear axes intersects the gear flanks in straight lines and wherein further a cylinder encircling the gear and cutting the teeth at their respective midplanes will define with said teeth a series of concavely curved lines.

---

Figure 9:
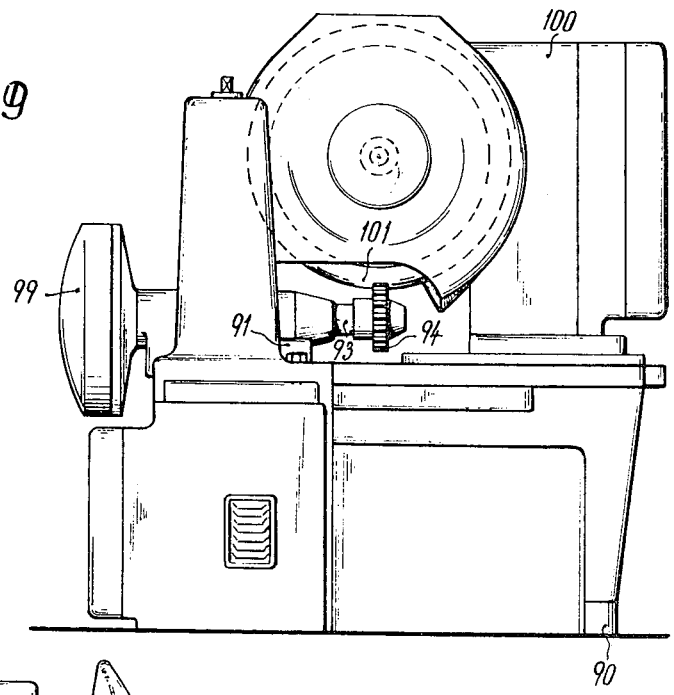

The invention relates to a pair of spur gears operating with crossed axes and to a method of manufacturing same.

The usual spur gear systems with crossed axes have the disadvantage that the tooth flanks contact each other only in a single point, namely, the so-called axes crossing point. This so-called point contact results in a system which is capable of transmitting only a relatively small amount of force. For this reason, gear systems of this type are utilized up to now only in less important locations.

It is already known to provide spur gears with teeth whose flanks are concavely curved in a longitudinal direction. Such gear forms are, for example, provided in tools utilized for gear shaving. There are also gears known with concavely curved teeth. This gear is, however, not designed for a gear drive with crossed axes and consequently it is not necessary to follow the design rules which are otherwise necessary for satisfactory operation.

All known practices have the disadvantage that the cutting does not follow the plane in which the involute lies. This error is at its maximum when two corresponding spur gears with straight flanks or of convexly crowned teeth run together. The involute in these gears lies in the transverse plane. The cutting, however, in case of crossed axes does not follow the transverse plane which shows that the cutting does not follow the involute. This in turn results in pitch errors in the cutting direction which leads to unacceptable operation. Thus, there occurs a longitudinal tooth bearing either under conditions of normal wear or during a running-in period. Still the teeth are worn at both foot and head so that while they approach an ideal condition in lengthwise direction, they depart from this ideal condition in a radial direction.

The purpose of the invention is to avoid these disadvantages by providing a pair of gears which has a line contact during the cutting operation and in which the involute lies in the cutting plane.

The basic concept of the invention is accordingly that the lines formed by the intersection of the plane, which lies parallel to both gear wheel axes, and the corresponding flanks of both wheels are straight lines.

A further characteristic of the invention is that the involute of both wheels lies at least close to the cutting plane (normal section). The ideal condition is when the involute of both wheels lies in the normal section.

There is a special case in which one of the two wheels is modified in lengthwise direction so that the involute of this wheel lies in the cutting plane, namely, in the case of a straight-toothed spur gear. The other gear must, however, to obtain the purpose of the invention, be specially designed. If in this particular case, for example, the shaving wheel is made geometrically similar to the straight-toothed spur wheel, then there is obtained automatically on the opposite wheel an involute in the desired plane. This method has, however, the disadvantage that a special tool is required. Further, it is only a special case.

According to the invention, the gears of corresponding gear pairs are so made that the direction of advancement of one tool for cutting a workpiece follows a line relative to the workpiece perpendicular to the workpiece axis.

Advantageously a pair of gears may be manufactured according to the invention in such a manner that at least one of the two gear wheels is made by a single grinding wheel on a known type of gear cutting machine which operates in only one cutting direction, and wherein the grinding wheel is shaped to generate the form of the tooth flanks described below. There are indeed known gears, especially tools for gear shaving with a cutting and simultaneous plunge grinding wheel, which up to now do not take notice of the above-described design rules.

The above-described method according to the invention is in contrast with the known methods in which a tool corresponding to the counter-gear is axially driven. The advantage thereof is that according to the invention the tool can be so guided that both gears of a gear pair are made with the same shaving wheel which follows a shaving path relative to the workpiece which is perpendicular to the workpiece axis. There is therefore no special work necessary. Although in the above, reference has been made only to a shaving wheel, it is also intended to designate tools for other types of tooth working according to the invention in which workpieces with crossed axes are cut. Under this designation such further reference is made to lapping, burnishing and honing tools.

A further possibility of carrying out the method according to the invention is that one of the two wheels of a gear pair is made with a single shaving wheel whose form corresponds to the form of the counter-wheel to the wheel being worked and which is arranged perpendicularly to the workpiece axis. In this method, as indeed in the known methods, there must be made a special tool corresponding to the counter-wheel. However, the method according to the invention provides an operationally superior pair of wheels. Further, the counter-wheel by known methods cannot be made hyperboloidically.

Further, drive systems can advantageously be provided with shafts extending somewhat parallel from a housing to provide a narrow axis crossing and to shape the wheels according to the invention. By this axis crossing there is provided a lengthwise sliding which softens the noise at the cutting point (corresponding point of both cutting circles). The drive system runs consequently more easily at the desired axis crossing. Further advantages of the invention are set forth in the description. A further problem lies in the fact that during its advance the grinding tool usually runs from one side of the workpiece to the other side thereof and the workpiece may be so guided by known crowned grinding apparatus that it describes cylindrically arranged lines on the tooth flanks which are concavely curved with respect to the midplane of the teeth.

Thus, with known crowned grinding apparatus, the lengthwise advance of the tool relative to the workpiece from one end of a tooth to the other end thereof may be so guided that the thickness of the tooth at the two ends is less than at the middle thereof. This form of tooth normally serves to avoid excessive wear at the ends of the teeth where the shafts are not mounted parallel to each other.

This known apparatus permits also a reciprocable control, namely, that one can develop not only at the midplane of a tooth a convex tooth flank but also a concave tooth flank. Thus, one can with such known apparatus develop teeth which are thicker at their ends than in the middle. Up to now, very little use has been made of this possibility. According to the invention, this apparatus may be used for the manufacture of gears which operated with crossed axes. In this manner, the curvature of a concave crown may be so measured by calculation or experimentation that it provides the characteristic form of the invention described above.

DETAILED DESCRIPTION

Figure 10:
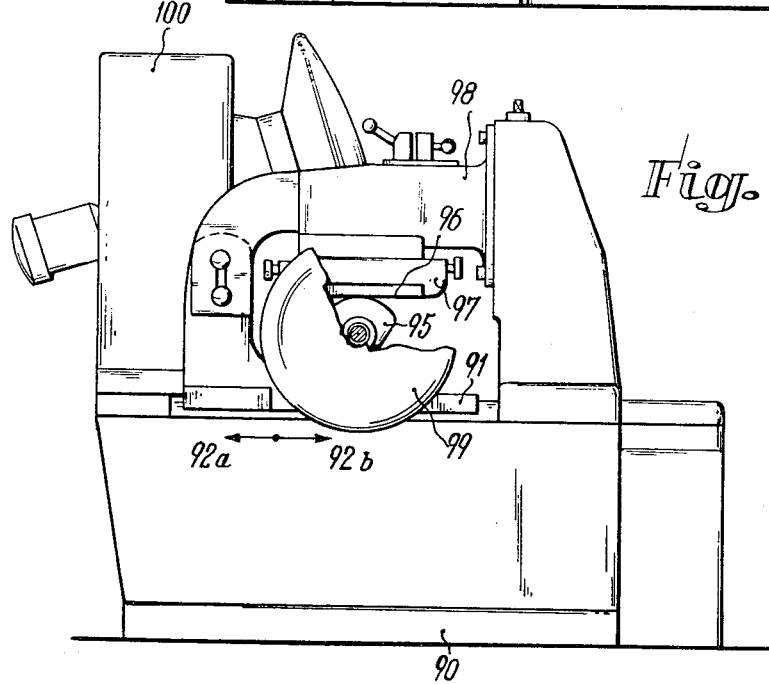

The invention is described in connection with the drawings in which:

FIGURE 1 schematically illustrates the pitch members (pitch cylinders) of a pair of gears which rotate about crossed axes, FIGURE 2 schematically illustrates the pitch members of a pair of gears framed according to the invention, FIGURE 3 is a schematical view of the addendum of a tooth of a prior art helical gear, FIGURE 4 is a transverse plane of such a tooth along the line IV—IV of FIGURE 3, FIGURE 5 is a longitudinal cross-sectional view parallel to the wheel axis of the tooth of the prior art helical gear along the line V—V of FIGURE 4, FIGURE 6 is a schematical longitudinal cross-sectional view according to FIGURE 5 of a tooth of a gear of the pair of gears according to the invention along the line V—V of FIGURE 4, FIGURE 7 schematically illustrates a tooth of a gear of the invention viewed in the same manner as FIGURE 3, FIGURE 8 is a schematical fragmentary view of a pair of gears according to the invention, FIGURES 9 and 10 illustrate a gear cutting machine on which gears can be cut according to the invention.

FIGURE 1 illustrates the pitch cylinder 10 of a gear which is otherwise not illustrated, which pitch member shaves the pitch member 11 of a countergear which is also not illustrated. The axes 12 and 13 are crossed. Both pitch members contact each other on the common normal which results in the known pitch point 15. As is known, the teeth of a pair of gears which rotates at crossed axes contact each other only at said pitch point at which the so-called point contact is located. This permits only a small loading of these gears which means that they can be used only for lesser purposes.

FIGURE 2 illustrates in a corresponding schematic arrangement a gear of the invention. The one gear of the pair of gears has a hyperboloid pitch body 20 and the countergear has also a hyperboloid pitch body 21. Their surface lines 20a, 21a are, depending upon the crossing angle of the axes 22, 23, formed in such a way that the pitch cylinders contact according to the invention on the longest possible lines. The pitch point 25 on the common normal is thus no longer the only contact point. The invention can be modified so that a pitch body, for example 20, is a hyperboloid and the other pitch member, for example 21, is a cylinder.

The character of the invention is illustrated in detail in FIGURES 3 to 7. FIGURE 3 illustrates a tooth 30 of a known helical gear. Addendum 31, teeth surfaces 32, 33 and dedendum 34 are marked by various shadings. The illustration is simplified in that the addendum edges 35 and the dedendum edges 36 are illustrated in straight lines. However, in reality they extend helically (unexact but common term; spirally) around the axis 37. FIGURE 4 illustrates a cross section along the line IV—IV of the tooth. If said tooth is cut in a plane V—V which is parallel to the axis 37, a form is obtained as is illustrated in FIGURE 5, namely, because the addendum and dedendum edges and the corresponding lines extend helically on the tooth flanks around the axis, a crowned cross section 50 with flank lines 51, 52 is formed. The pitch points 15 are positioned on the highest points of the crowning.

FIGURE 6 illustrates a corresponding cross section of tooth of the invention. This cross section 60 is a parallelogram. The flank lines 61, 62 are straight. Since the flank lines of the countergear (not illustrated) are also straight—because the pitch cylinder of the countergear has also a hyperboloid form—instead of a point contact a line contact is provided in the gearing of the invention.

From this illustration it can also be understood in which manner the above-described case—member 20 hyperboloid, member 21 cylindrical—fit into the sense of the invention, namely in the special case when the gear with the cylindrical gear member is straight fluted. The teeth of the gear with the cylindrical body have then too a trapezoidal form (rectangular shape) and result in a line contact together with the countertooth according to FIGURE 6.

However, if the gear with the cylindrical pitch member would be helically toothed, the flank lines of the hyperboloid gear would have to be concavely inclined so that concave flanks would closely contact the convex flanks 51, 52. This gear pairing results in various complications, among others a dividing mistake in the pitch plane (normal plane) similar to the gearing according to FIGURE 1, because the shaving along the involute does not take place on the entire contact line.

FIGURE 7 illustrates a tooth 70 of the invention taken in the same manner as FIGURE 3. If one assumes a cylindrical addendum surface of the gear, then the longitudinal edges 71 of the addendum illustrate concave curves. However, if one moves with the tip of a writing instrument along the plane which is parallel to the gear axis (without rotating the gear thereby), then this tip defines straight lines 72, 73. These straight lines are for example the intersecting lines of a plane 86 which is positioned parallel to the axes 82, 83 of the meshing gears 80, 81 through the contact point 87 of the cooperating flanks 87, 89. Said contact lines positioned in the mentioned plane are an important characteristic of the invention. The surface lines positioned thereabove or thereunder are also straight lines.

The gears of the invention are made according to the invention in such a way that, for example, the shaving gear which is used as a worktool for both gears cuts into the teeth of workpiece 20 and counterworkpiece 21 whereby, according to the invention, the involute of the workpiece is positioned in the pitch plane thus in the normal section. Thus, the worktool is advantageously a straight-fluted gear which is an important characteristic of the invention.

FIGURES 9 and 10 illustrate a grinding machine, on which gears of the invention can be made. Such machines are known. Therefore, the machine will be described only briefly. A workpiece carriage 91 movable in the direction of arrows 92a, 92b is supported on a machine frame 90, said workpiece carriage being provided with any conventional means for driving same. A workpiece spindle 93 is pivoted on said workpiece carriage and the workpiece 94 is clamped on said workpiece spindle. The workpiece carriage carries a known cam 95 having known cam followers 96 secured thereto which are mounted on the machine frame 90 through a suitable holder 97 and a bridge 98. A known advancement mechanism 99 is provided at the end of the workpiece spindle. A grinding wheel 101 adjustable to the angle of the workpiece is arranged on the machine frame in a known manner by means of a wheel stand 100. Upon back and forth movement of the workpiece table in direction of arrows 92a, 92b the workpiece surfaces are cut by the grinding wheel without advance in direction of the workpiece axis.

The inventive flank shape on the workpiece is produced according to the invention by means of a grinding wheel which is trued so that flank lines 72 are created.

Said grinding wheel shape can be predetermined by means of geometry. However, it is easier to determine same by experimentation.

While hyperboloid pitch members have been referred to above for illustrative purposes, the invention is not limited thereto. Instead, the surface lines 20a, 21a can also be parabola, parts of ellipses or other curves. The straight flank line 72, 73 or the parallelogram-shaped cross section of the tooth is important for the invention so that according to the invention the involutes be in the pitch planes (normal planes). This cannot occur in the case of normal helically toothed (more exactly, spirally shaped toothed) gears because with such teeth the addendum and dedendum have different helix angles so that the normal planes constantly change their direction during cutting.

The embodiments of the invention in which an exclusive property or privilege is claimed are defined as follows:

1. A gear train comprising a pair of interengaging spur gears operating with crossed axes wherein the crossing angle is less than thirty degrees but greater than zero degrees, a theoretical plane positioned midway between and parallel to the gear axes intersects the gear flanks in straight lines, and a theoretical cylinder encircling one of the gears and cutting the teeth at their respective midplanes defines with said teeth a series of concavely curved lines.

2. A gear train according to claim 1, wherein said spur gears are involute gears and wherein the involute of the teeth of both gears lie at least close to the normal section through the teeth of one of the gears.

3. A gear train according to claim 2, wherein the involutes of both spur gears lie in the normal section through the teeth of one of the gears.

4. A method for the manufacture of a spur gear which is so cut as to operate with cross axes having a crossing angle of less than thirty degrees but greater than zero degrees with respect to another spur gear and such that the lines of intersection with corresponding flanks of such teeth by a theoretical plane which is parallel to the axes of said crossed spur gears are straight lines, the steps comprising advancing the work tool from one side face of the workpiece to the other side face thereof and guiding the work tool so that it describes on the flanks of the workpiece teeth cylindrically arranged lines which are curved concavely at the midplane of the teeth.

5. A method of manufacture of a spur gear according to claim 4, wherein the work tool for cutting the workpiece is advanced perpendicularly to the workpiece axis.

6. A method according to claim 5, wherein the spur gear and the other spur gear of the gear pair are made with the same shaving wheel, said shaving wheel being advanced in a direction perpendicular to the workpiece axis.

7. A method according to claim 5, wherein the spur gear is made with a shaving wheel whose form corresponds to the form of the other spur gear being made and which is advanced in a direction perpendicular to the workpiece axis.

References Cited
UNITED STATES PATENTS 2,908,226  10/1959  Rich et al. _____ 103—128
2,935,887   5/1960  Wildhaber _____ 74—458

OTHER REFERENCES

Merrit, H. E.: "Gears," 3rd. ed., London, Pitman & Sons, Ltd., 1954, pages 41, 42 (paragraph 4.11), TJ 184.M4 1954.

LEONARD H. GERIN, Primary Examiner

U.S. Cl. X.R.

29—159.2; 74—462; 90—1.6